United States Patent
Bunk et al.

(10) Patent No.: US 6,667,573 B2
(45) Date of Patent: Dec. 23, 2003

(54) HALOGEN INCANDESCENT LAMP

(75) Inventors: Axel Bunk, Munich (DE); Walter Ciupke, Herbrechtingen (DE); Guenter Kreis, Gerstetten (DE); Thomas Kass, Ingolstadt (DE); Joachim Koziol, Heidenheim (DE); Rolf Minder, Nattheim (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 54 days.

(21) Appl. No.: 10/126,385

(22) Filed: Apr. 19, 2002

(65) Prior Publication Data

US 2002/0163303 A1 Nov. 7, 2002

(30) Foreign Application Priority Data

May 3, 2001 (DE) .......................................... 101 21 579

(51) Int. Cl.$^7$ ................................................. H01K 1/50
(52) U.S. Cl. ........................ 313/579; 313/578; 313/493; 313/634
(58) Field of Search ................................. 313/579, 493, 313/528, 623, 624, 634

(56) References Cited

U.S. PATENT DOCUMENTS

| 4,005,324 A | * | 1/1977 | Dolenga et al. ............. 313/222 |
| 4,208,609 A | * | 6/1980 | Berlec ......................... 313/341 |
| 5,886,466 A | | 3/1999 | Bell et al. |

* cited by examiner

*Primary Examiner*—Vip Patel
(74) *Attorney, Agent, or Firm*—Frishauf, Holtz, Goodman & Chick, P.C.

(57) ABSTRACT

A halogen incandescent lamp, in particular a miniature halogen incandescent lamp with an electrical power consumption of at most 10 W, that is suitable for use in a pocket lamp. The outside diameter of the lamp bulb is 3.0 mm to 6.2 mm, and the sections (4a, 5a) arranged in the interior (3) of the lamp bulb (1), of the supply leads (4, 5) for the incandescent filament (2) are constructed as flattened wires in order to minimize shading effects.

5 Claims, 1 Drawing Sheet

HALOGEN INCANDESCENT LAMP

FIELD OF THE INVENTION

The invention relates to a halogen incandescent lamp having a lamp bulb that has a transparent, cylindrical lamp bulb region, having a fill gas that is enclosed in the interior of the lamp bulb and contains an inert gas or an inert gas mixture and a halogen additive, having an incandescent filament arranged in the interior of the lamp bulb and having two supply leads for the incandescent filament. What is concerned, in particular, is a miniature halogen incandescent lamp with an electric power consumption of at most 10 W that is provided for use in the reflector of a battery-powered pocket lamp.

BACKGROUND OF THE INVENTION

Such a halogen incandescent lamp is disclosed in Patent Specification U.S. 5,886,466. The halogen incandescent lamp described in this document has a transparent, essentially cylindrical lamp bulb with a diameter of 6.3 mm to 8.0 mm. The lamp bulb is filled with an inert gas, in particular xenon, that is provided with a halogen additive, and encloses an incandescent filament that is connected in an electrically conducting fashion to two supply leads projecting from the lamp bulb.

SUMMARY OF THE INVENTION

It is an object of the invention to increase the useful fraction of the light produced by the incandescent filament in the case of a halogen incandescent lamp of the generic type, and to improve the imaging properties of the system in the event of use of this lamp in a reflector.

This and other objects of the invention are achieved in accordance with one aspect of the present invention directed to a halogen incandescent lamp having a lamp bulb that has a transparent, cylindrical lamp bulb region, a fill gas that is enclosed in the interior of the lamp bulb and contains an inert gas or an inert gas mixture and a halogen additive, and an incandescent filament arranged in the interior of the lamp bulb and having two supply leads for the incandescent filament. The sections, running in the interior of the lamp bulb of the lamp bulb of the supply leads are constructed as flattened wires, and the outside diameter of the cylindrical lamp bulb region has a value of 3.0 to 6.2 mm.

DETAILED DESCRIPTION OF THE DRAWINGS

Figure 1:
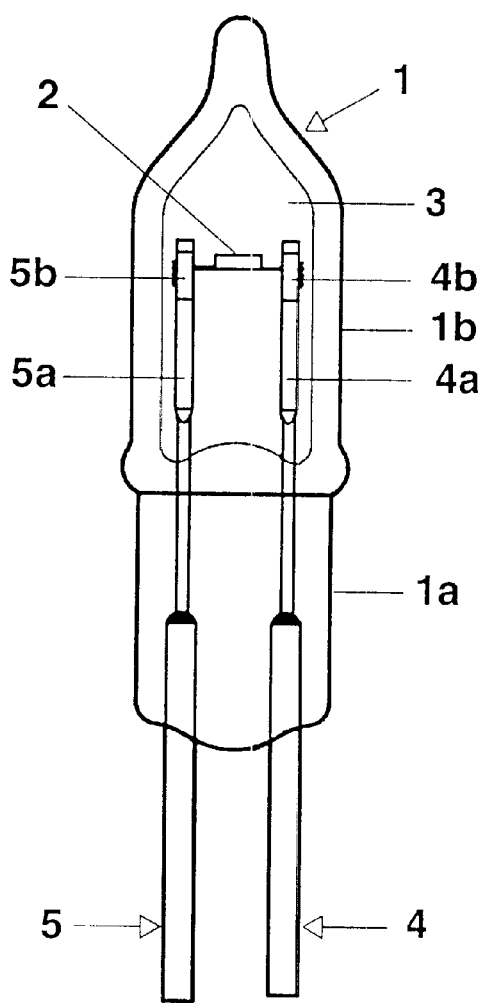
FIG. 1 shows a first side view of the halogen incandescent lamp according to the invention.

In the halogen incandescent lamps according to the invention, the sections of the supply leads projecting into the interior are constructed as flattened wires. As a result, the shading effect caused by the supply leads is substantially reduced over a wide solid angle, and thus the useful fraction of the light produced by the incandescent filament is substantially increased. Moreover, by comparison with the prior art the halogen incandescent lamp according to the invention has a lamp bulb with a reduced outside diameter. As a result, the useful reflector surface in the vertex region of the reflector can be en larged and more light reflected in the event of use of the halogen incandescent lamp according to the invention in a reflector. The two measures named above contribute to an increased luminous intensity in the axial direction of the reflector.

The ends of the flattened supply lead sections are advantageously of hook-shaped design and are connected to the incandescent filament by a welded connection in order to ensure reliable suspension and contacting of the filament. The hook-shaped ends are preferably bent back even by an angle of 180 degrees, in order to permit the incandescent filament ends to be fixed in a clamped fashion between the two limbs of the hook-shaped ends. The additional welded connection prevents the hook-shaped ends from opening again during the operation of the lamp. The welded connection is advantageously executed as a spot welded connection, for example by means of a LASER, the spot welds being arranged on the outer edges of the hook-shaped ends such that they do not project beyond their contour, so as not to cause further shading of the light by the weld.

Xenon that is provided with a halogen additive is advantageously used as fill gas. Of all inert gases that can be used, xenon has the largest atomic mass and is therefore best suited for reducing the tungsten evaporation rate of the wire of the incandescent filament. For this purpose, the fill gas pressure preferably has a value of between 5 bars and 30 bars at room temperature. By means of the halogen cycle, the halogen additive prevents blackening of the lamp bulb by the tungsten evaporating from the incandescent filament. The reduction in the tungsten evaporation rate by the high xenon gas pressure permits either an increase in the temperature of the incandescent filament and thus a raising of the light yield, or alternatively a lengthening of the service life of the lamp. The lamp bulb preferably consists of a hard glass or a quartz glass in order to ensure an adequate burst pressure resistance of up to 80 bars and an adequate thermal resistance of up to 750° Celsius and an adequate resistance to chemical attack by the halogen fill.

Turning now to the drawings, the halogen incandescent lamp has a lamp bulb 1 made from hard glass which has a cylindrical lamp bulb region 1b and a pinch foot 1a sealed in a gas tight fashion. The cylindrical lamp bulb region has an outside diameter of 5.0 mm±0.2 mm. An incandescent filament 2 consisting of tungsten is arranged in the interior of the lamp bulb 1, and in particular in the interior 3 of the cylindrical lamp bulb region 1b. The incandescent filament 2 is supplied with electric power by means of two supply leads 4, 5. The supply leads 4, 5 are guided through the pinch foot 1a. The sections of the supply leads 4, 5 projecting from the lamp bulb 1 are designed as contact pins. The sections 4a, 5a of the supply leads 4, 5 arranged in the interior 3 of the lamp bulb 1 are constructed as flattened wires. Their ends 4b, 5b are bent back by an angle of 180 degrees and in each case form a hook 4b, 5b in which one end of the incandescent filament 2 is fixed in a clamped fashion in each case. The outer edges—but not the plane upper surfaces—of the hook-shaped ends 4b, 5b of the supply leads 4, 5 are provided with spot welds in order to prevent opening of the hook-shaped ends 4b and 5b, respectively, and to ensure reliable electric contact is made.

The halogen incandescent lamp has an electric power consumption of 3.3 W in conjunction with a supply voltage of 2.7 V, a fill gas pressure of 15 bars (at room temperature) in the form of xenon with a 400 ppm halogen additive, a light yield of 13.6 lm/W, a mean color temperature of 3140 kelvins, and a nominal service life of 60 hours.

Figure 2:
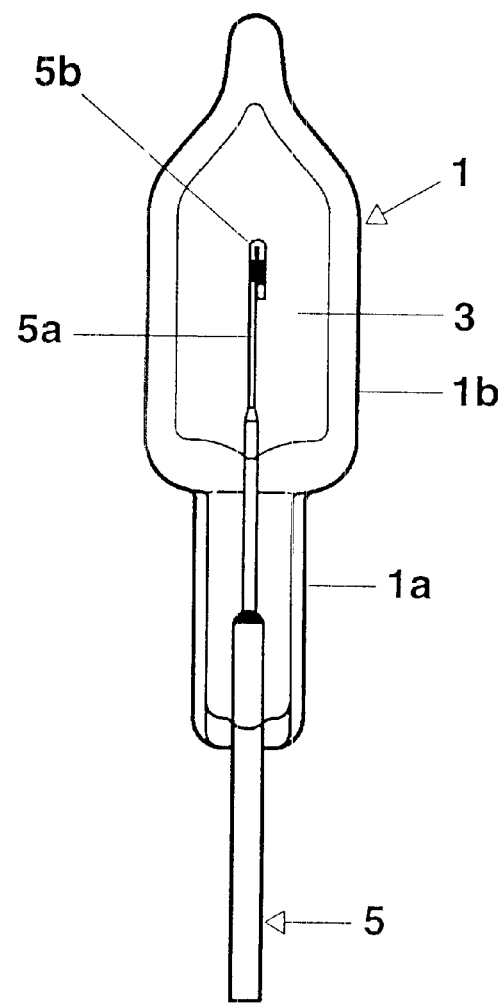
FIG. 2 shows a second side view, rotated by 90 degrees as compared with FIG. 1, of the halogen incandescent lamp according to the invention.

The halogen incandescent lamp in accordance with another embodiment utilizes the same structure shown in FIGS. 1 and 2. However, it has an electric power consumption of 1.0 W in conjunction with a supply voltage of 2.2 V, a fill gas pressure of 15 bars (at room temperature) in the form of xenon with a 200 ppm halogen additive, a light yield of 10.0 lm/W, a mean color temperature of 3100 kelvins, and a nominal service life of 20 hours.

What is claimed is:

1. A halogen incandescent lamp having a lamp bulb that has a transparent, cylindrical lamp bulb region, having a fill gas that is enclosed in the interior of the lamp bulb and contains an inert gas or an inert gas mixture and a halogen additive, having an incandescent filament arranged in the interior of the lamp bulb and having two supply leads for the incandescent filament, wherein the sections, running in the interior of the lamp bulb of the supply leads are constructed as flattened wires, and the outside diameter of the cylindrical lamp bulb region has a value of 3.0 to 6.2 mm.

2. The halogen incandescent lamp as claimed in claim 1, wherein the ends of the flattened wires are of hook-shaped design and are connected in each case to the incandescent filament by means of a welded connection.

3. The halogen incandescent lamp as claimed in claim 1, wherein the inert gas or inert gas mixture is xenon.

4. The halogen incandescent lamp as claimed in claim 3, wherein the fill gas pressure has a value of between 5 bars and 30 bars at room temperature.

5. The halogen incandescent lamp as claimed in claim 1, wherein the fill gas pressure has a value of between 5 bars and 30 bars at room temperature.

* * * * *